Aug. 1, 1967    R. A. KIRBY    3,333,655
INTERVAL VELOCITY WELL LOGGING SYSTEM
Filed Oct. 27, 1961    3 Sheets-Sheet 1

ROBERT A. KIRBY INVENTOR.

BY *Gary C. Honeycutt*

AGENT

ROBERT A. KIRBY *INVENTOR.*

BY *Gary C. Honeycutt*
AGENT

United States Patent Office 3,333,655
Patented Aug. 1, 1967

3,333,655
INTERVAL VELOCITY WELL LOGGING
SYSTEM
Robert A. Kirby, Tulsa, Okla., assignor, by mesne assignments, to Esso Production Research Company, Houston, Tex., a corporation of Delaware
Filed Oct. 27, 1961, Ser. No. 148,124
10 Claims. (Cl. 181—.5)

This invention is directed to the velocity logging of earth strata traversed by a well bore. Broadly, the invention is a system for measuring and recording the interval velocity of an acoustic pulse travelling through the various earth formations surrounding a borehole. More specifically, a system is provided which includes an acoustic source and two detector devices spaced therefrom, the combination being adapted to be moved through a well bore, and surface apparatus for converting the detector pulses into a voltage which is directly proportional to the seismic wave velocity characteristic of the formation interval spanned by the detectors. This voltage is fed to a strip chart recorder which gives a continuous log reading directly as interval velocity vs. borehole depth. The invention is especially applicable to the logging of relatively shallow boreholes having a small diameter, such as a "shot-hole" for geophysical exploration.

It is a conventional technique in the art of geophysical prospecting to initiate a seismic disturbance at a point near the surface of the earth, and to measure precisely the times required for seismic waves to travel from the disturbance point down to the various subsurface discontinuities from which the waves are reflected, and thence back to the earth's surface. The seismic disturbance is usually created by detonating an explosive charge within a relatively shallow borehole, commonly known as a shot-hole. A careful positioning of the charge within the shot-hole is necessary in order to obtain an efficient transmission of seismic energy to the greatest depth of interest. That is, the shot-hole must be logged to determine the wave propagation velocity characteristic of each formation interval surrounding the borehole, so that, for example, the charge will not be inadvertently detonated opposite an extremely low velocity layer, or just above some highly refractive interval. The low velocity layer would absorb a substantial fraction of the seismic energy, whereas the refractive interval would reflect and divert the waves from their downward path, the result in either event being a severe detriment to the quality of seismic records obtained.

The logging of a shot-hole presents special problems not normally associated with the logging of an ordinary well bore. First of all, the shot-hole has a relatively small diameter. Accordingly, the logging tool must also have a small diameter, giving rise to the need for an especially efficient, small diameter acoustic wave generator device. At the same time, the logging tool must not be as long as the conventional tool, since it would lodge in relatively slight borehole deviations. Thirdly, the tool must be capable of obtaining reliable data from formation intervals near the surface of the earth. The tool provided by this invention effectively overcomes these difficulties, as will be made apparent by the following description.

The logging operation begins with the generation of an acoustic pulse in the vicinity of the interval to be measured. The pulse is transmitted as a compressional wave through the borehole fluid into the surrounding formation. As the pulse travels through the surrounding formation it is refracted back into the borehole fluid where it is detected by pressure-sensitive detectors. Since the two detectors are longitudinally spaced a fixed distance apart, the pulse transmitted through the formation arrives at the farthest detector at a later time than it arrives at the nearest detector. This time interval is an inverse measure of the velocity at which an acoustic wave traverses the formation interval spanned by the two detectors. The detector signals are transmitted up the cable to the surface where they are electronically processed to provide a continuous log directly as interval velocity vs. borehole depth.

The system employs a variable delay line to delay the signal generated by the first detector until it coincides in time with the signal generated by the second detector, as displayed on a dual beam cathode ray oscilloscope. A series of switches on a shaft common with those used to change the time delay provides a voltage which is proportional to the interval velocity of the formation. A strip chart recorder is used to continuously plot a log of interval velocity vs. the borehole depth. The chart drive means is controlled by a measuring sheave at the borehole surface.

The oscilloscope sweep voltage generator must be triggered with precise timing, such that the time lapse between the generation of each seismic pulse and the initiation of each sweep cycle remains constant. Moreover, an accurate visual alignment of the oscilloscope traces is greatly facilitated by expanding the critical portions thereof to cover a large area of the screen. Novel means are provided for the generation of a voltage spike simultaneously with the generation of each seismic wave. The spike is then modified to form a delayed trigger pulse for actuating the sweep voltage generator, with a constant time lapse subsequent to the generation of each seismic pulse.

A detailed description of the invention is provided by reference to the following drawings.

Figure 1:
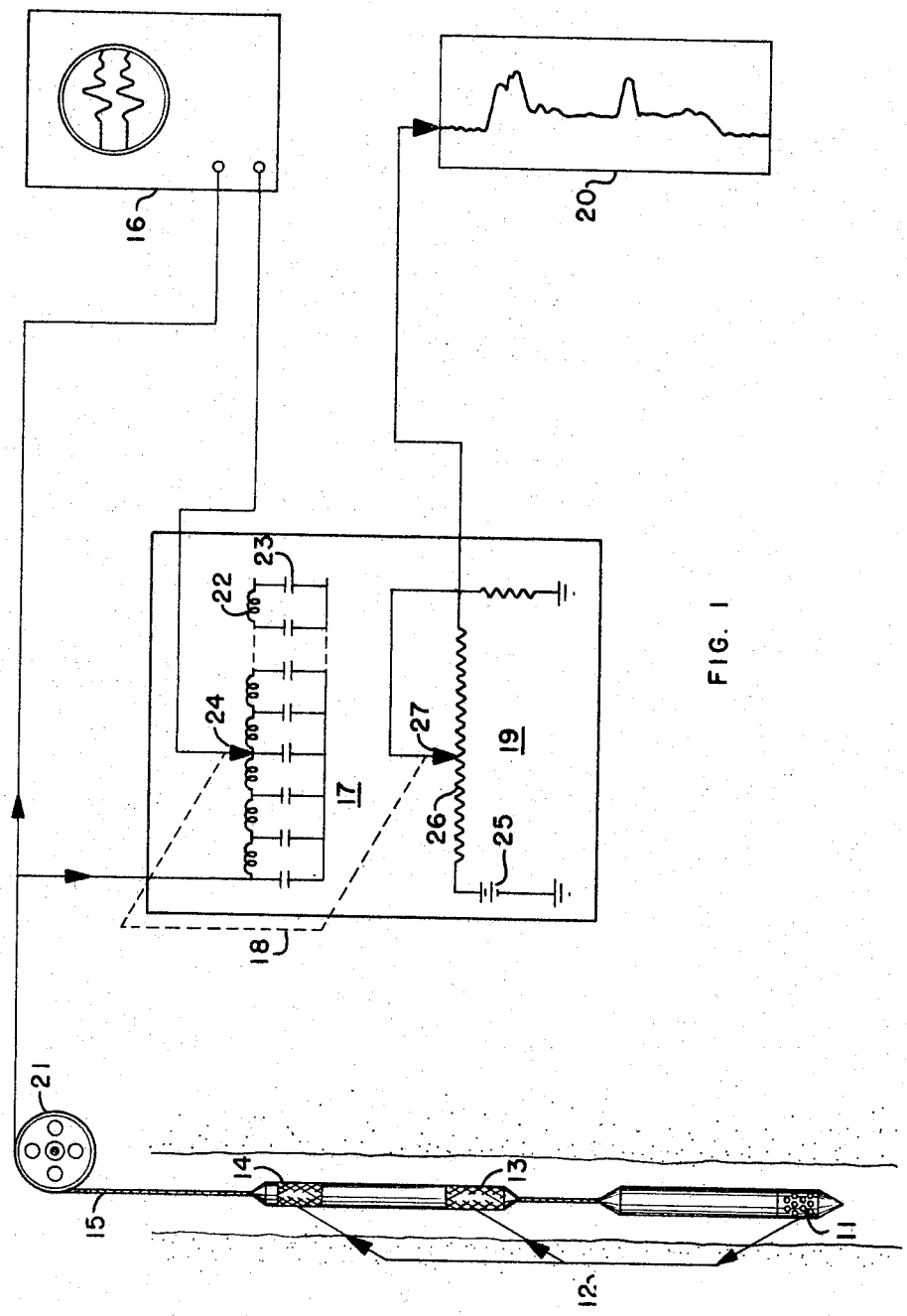
FIGURE 1 is a schematic diagram of the various components of the system, showing the complete logging operation.

Referring now to FIGURE 1, the system includes acoustic generator 11, electro-acoustic transducer-detector 13 and 14, multiconductor cable 15, dual-trace oscilloscope 16, variable delay line circuit 17, a double-tiered switch deck designated by dotted line 18, a voltage source and potentiometer assembly 19, strip chart recorder 20, and measuring sheave 21 at the borehole surface. The cycle of operation of the system begins with the generation of an acoustic pulse by the acoustic source 11. This pulse is transmitted as a compressional wave through the borehole fluid into the surrounding formation via path 12. As the pulse travels through the surrounding formation it is refracted back into the borehole fluid due to the greater seismic velocity characteristic of the formation relative to that of the borehole fluid. The signal is then detected by each of the pressure-sensitive detectors 13 and 14. The time elapsed between the arrival of the pulse at detector 13 and the arrival of the pulse at detector 14 is an inverse measure of the velocity at which an acoustic wave traverses the formation interval spanned by the two detectors. The detector signals are transmitted along cable 15 to the surface.

The signal from detector 14 is passed directly to the upper trace of dual trace oscilloscope 16. The signal from detector 13 is passed through delay line circuit 17 and thence to the lower trace of the oscilloscope. The operator manually controls the delay line such that the signal from the detector 13 is delayed in time an amount exactly equal to the time interval between the arrival of the pulse at detector 13 and detector 14. This is accomplished by visual comparison of the traces on the oscilloscope. That is, by controlling the amount of delay the operator maintains the two traces in vertical alignment. The switch deck 18 which controls the delay line circuit is coupled with a voltage source and potentiometer assembly 19 such that the time delay is converted to a voltage which is proportional to the interval velocity of the formation. This voltage is used to drive the recording pen motor on strip chart recorder 20. The chart is driven in a conventional manner by a servo system controlled by measuring sheave 21 at the borehole surface.

The logging tool is constructed in two sections. The lower section contains the acoustic pulse generator and the upper section contains the detector devices. The two sections are joined by a short length of multiconductor cable. This arrangement permits greater freedom of movement in traversing bore deviations. It also eliminates the need for acoustic insulation between the source and the detectors. Moreover, the location of the source below the detector assembly, instead of thereabove as in prior art tools, permits logging nearer the surface of the earth.

Detectors 13 and 14 consist of two independent and identical pressure-sensitive devices separated a convenient distance, for example two feet from center to center, and mounted as a single unit. The detecting crystals used are a ceramic material known as PZT–5, manufactured by the Clevite Corporation. The crystal units are cylinders, one inch in diameter, one inch in length and having a wall thickness of one-eighth of an inch. They are liquid filled and acoustically insulated from their supporting member. A thin rubber dam separates them from the borehole fluid. The detector crystals are coupled into their respective transistorized amplifiers contained in the body of the tool. A gravity operated mercury switch is used in the amplifier so that the amplifier batteries are turned on only when the tool is in an upright, operating position. Of course the invention is not limited to the use of these particular detectors. As will occur to one skilled in the art, any suitable electro-acoustic transducer may be used.

Delay line circuit 17 is composed of inductors 22 and capacitors 23. Output terminal 24 is adjustable to any one of the junctions along the line; in this manner a variable delay time is obtained. The operator makes this adjustment manually by controlling the position of one tier of a double tiered multi-terminal switch deck designated by dotted line 18, in order to maintain visually a vertical alignment of the oscilloscope traces. The other tier of terminals on the switch deck is connected to provide a selection of the position of terminal 27 with respect to resistance means 26. This selection, in combination with voltage source 25 provides a voltage output to the pen drive of chart recorder 20 inversely proportional to the time delay provided by circuit 17, and therefore directly proportional to the velocity of the interval spanned by the detectors. If desired, a voltage output to the recorder pen drive may similarly be provided which is directly proportional to the time delay, as will readily occur to one skilled in the art.

The movement of the chart in recorder 20 is continuously correlated with the depth of detectors 13 and 14 by means associated with measuring sheave 21 at the mouth of the borehole. This expedient is conventional in the well logging art.

Similarly, the details of the dual beam oscilloscope are not essential to a complete disclosure of this invention. A suitable oscilloscope is manufactured by Tektronix Corporation, Model 502.

Figure 2:
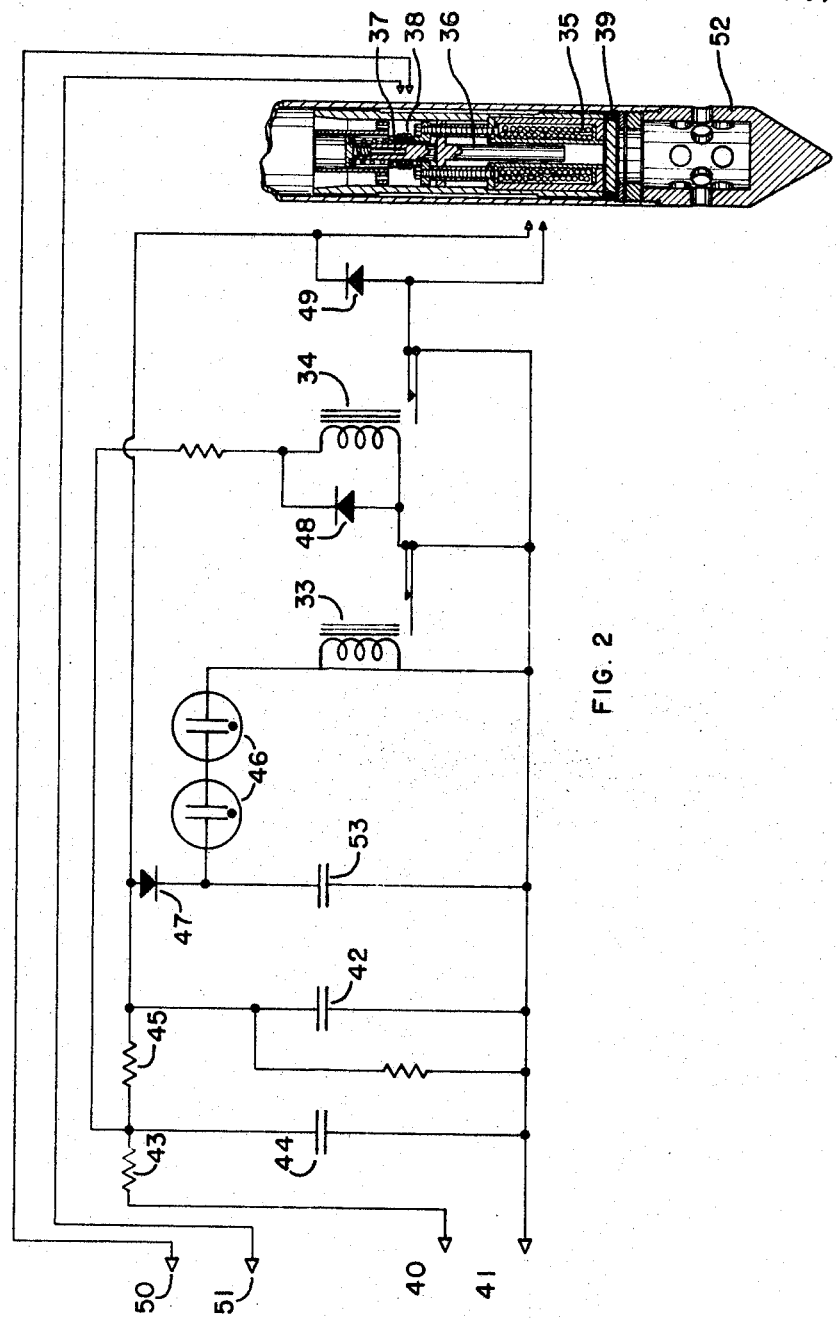
FIGURE 2 shows the details of the acoustic generator and the voltage spike generator.

Referring now to FIGURE 2, the components of the acoustic source include a bank of capacitors 42, relaxation oscillator lamps 46, relays 33 and 34, solenoid 35, spring loaded movable slug 36 which is attached to magnet 37 extending through coil 38, and anvil 39.

During operation, a DC voltage is impressed constantly across terminals 40 and 41. Terminal 40 is positive with respect to terminal 41. Capacitor bank 42 is charged through filter elements 43, 44 and 45. When the voltage across capacitance 42 reaches the ionization voltage of the neon lamps 46, the neon lamps conduct, causing current to flow through the coil of relay 33. The contacts of relay 33 complete the circuit of relay 34. Relay 34 operates to close the circuit of solenoid 35 thus discharging the capacitor 42 into the solenoid winding. The energized solenoid causes slug or other hammer means 36 to be pulled down with a great force toward anvil 39. Capacitor 53 ensures that lamps 46 stay ionized and consequently that relays 33 and 34 remain closed long enough for solenoid 35 to remain energized until the slug strikes the anvil. This impact of the slug on the anvil generates the acoustic pulse which is transmitted to the borehole fluid within tip 52. Rigidly attached to the solenoid driven slug is cylindrically shaped magnet 37. As the solenoid slug moves, it causes the magnet to move through the center of coil 38 thus generating a voltage in the coil. At the instant the slug strikes the anvil this motion is arrested and a voltage spike is thus generated in coil 38. This voltage spike is transmitted to terminals 50 and 51, thence up the cable and is used, after further shaping, as a trigger for the oscilloscope sweep voltage generator. The slug is then returned to its initial, or loaded position by a spring or by any other suitable means. Diode 47 prevents the discharge of capacitor 53 back through its charging path and through solenoid 35. Diodes 48 and 49 are used for relay contact protection. The discharge of capacitor 42 through the solenoid reduces the voltage across the neon lamps to a point where they are no longer ionized. At this time, relay 33 opens, causing relay 34 to open which in turn opens the circuit to solenoid 35. The capacitor bank 42 again starts to build up a charge and the cycle is repeated.

The frequency of pulse generation is controlled by the charging time of the capacitor bank 42. This rate is not critical since a trigger voltage for the oscillographic display is taken from the signal generated in solenoid 38 upon the impact of the slug on the anvil.

Figure 3:
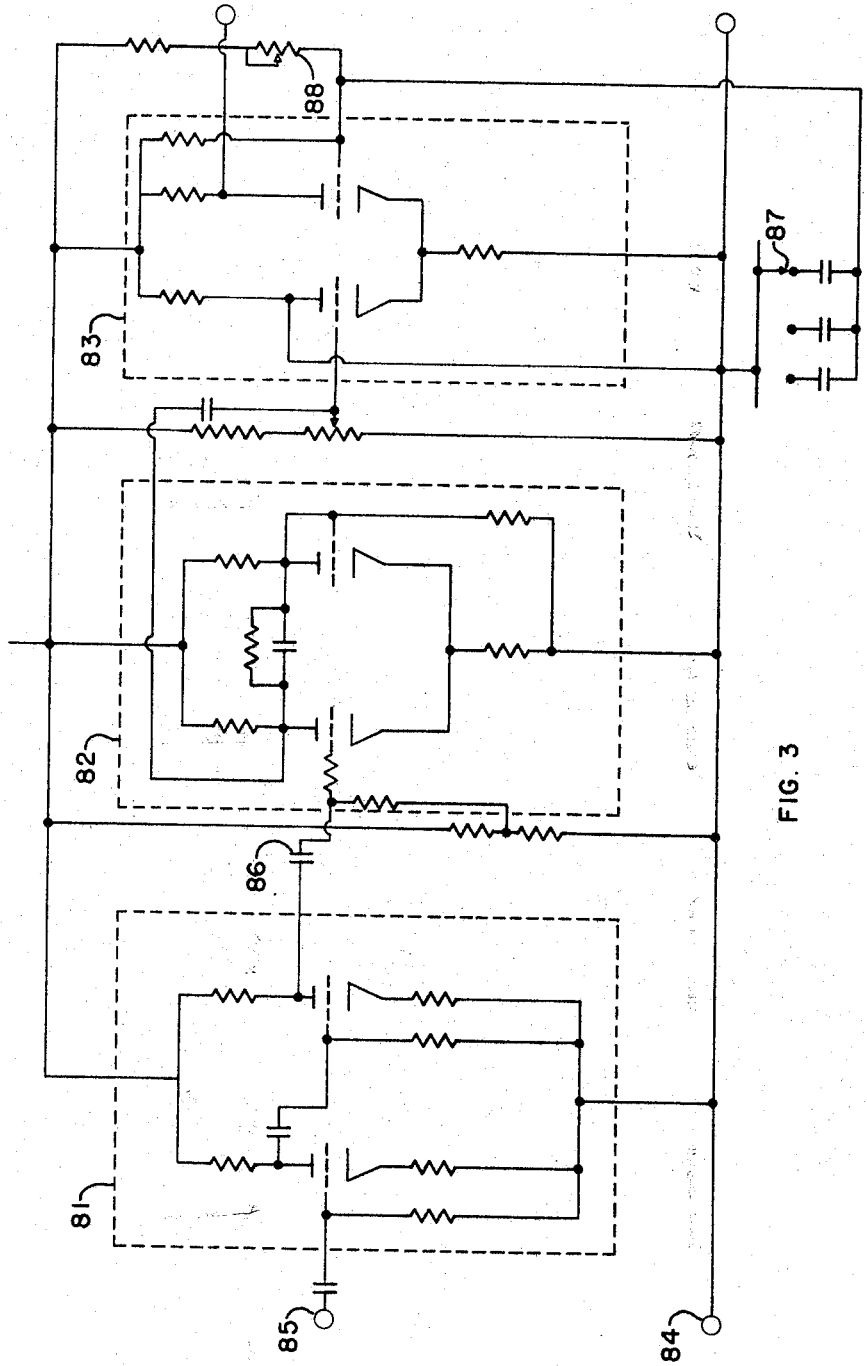
FIGURE 3 shows the oscilloscope sweep delay trigger circuitry.

Referring now to FIGURE 3 the sweep delay circuit includes amplifier 81, a cathode-coupled clipper circuit 82, which is also known as the Schmitt trigger circuit, and cathode-coupled mono-stable multivibrator circuit 83.

The trigger signal generated in coil 38 is fed to terminals 84 and 85 of amplifier circuit 81. The amplifier spike pulse is then filtered by condenser 86 to provide a single narrow peak wave which is fed to the clipper circuit 82 which converts the peak wave into a rectangular wave form which is then fed to the cathode-coupled monostable multivibrator circuit 83 which in combination with the range selector switch 87 and vernier control potentiometer 88 provides a controlled trigger pulse for actuating the sweep generator circuit for the oscilloscope.

The function of the range selector switch and vernier control potentiometer is to adjust the sweep delay as the logging tool moves from a relatively high velocity formation to a relatively low velocity interval, or vice-versa, so that the critical portion of the oscilloscope display does not drift off-screen.

The details of the circuits are not essential to a complete disclosure of the invention. The circuits are commercially available, for example, from the Engineered Electronics Company of Santa Ana, California, the amplifier circuit having Catalog No. Z8762, the clipper circuit Z90001 and the multivibrator Z8889.

The purpose of delaying the sweep is to permit increased sweep velocity and thereby cause an expansion of the critical portion of the oscilloscopic trace forms in order that the operator may make a more accurate vertical alignment of the pulses.

While a particular embodiment of the invention has been illustrated and described it is obvious that further modifications will be apparent to those skilled in the art. It is therefore intended to cover all such modifications of the invention as fall within the scope of the following claims.

What is claimed is:

1. An interval velocity well-logging system which comprises means for generating an acoustic pulse, first and second electro-acoustic transducer-detectors, said generator and detectors adapted to be suspended in substantially vertically spaced relationship within a well bore, a variable delay line circuit connected to receive the output from said first detector, a dual trace oscilloscope connected to receive and display the output from said second detector as one trace, and connected to receive and display the output from said delay line circuit as a second trace, a variable voltage source, means for actuating the sweep voltage circuit of said oscilloscope in response to each generation of an acoustic pulse; means for adjusting said delay line circuit, whereby an operator may visually maintain an alignment of the traces displayed by said oscilloscope; linkage means interconnecting said variable delay line circuit and said variable voltage source such that variations imposed on said delay line automatically adjust the output of said voltage source to a level inversely proportional to the time of delay provided by said delay line, oscillographic recording means comprising chart drive means and pen drive means, means for controlling said chart drive in response to the depth of said detectors within said well bore, and means responsive to the output of said voltage source for controlling said pen drive means.

2. A velocitiy well-logging tool comprising first and second housing members adapted to be suspended within a well bore in a substantially longitudinally spaced relationship, acoustic pulse generating means and voltage spike generating means mounted within said first housing member, a pair of substantially longitudinally spaced electro-acoustic transducers mounted within said second housing member, said acoustic pulse generating means including anvil means, a solenoid, and hammer means movably suspended within said solenoid and adapted to be driven against said anvil by said solenoid, said voltage spike generating means including a coil, and a magnet rigidly attached to said hammer means, said magnet being adapted to move within said coil as said hammer means moves toward said anvil means, such that the arrested motion of said magnet caused by each striking of said hammer against said anvil generates a voltage spike.

3. An acoustic well-logging system which comprises means for generating an acoustic pulse; first and second acoustic transducer-detectors; said generator and detectors being adapted for suspension in a substantially vertically spaced relationship within a wellbore; a variable delay line circuit connected to receive the output from said first detector; a dual trace cathode ray oscilloscope connected to receive and display the output from said second detector as one trace, and the output from said delay line circuit as a second trace; means for actuating the sweep voltage circuit of said oscilloscope in response to each generation of an acoustic pulse; means for adjusting said delay line circuit, whereby an operator may visually maintain an alignment of the traces displayed by said oscilloscope; and means for recording the adjustments made in said delay line circuit, as a measure of the velocity at which an acoustic pulse traverses each successive interval spanned by said detectors.

4. A system as defined by claim 3, wherein said means for generating an acoustic pulse comprises a hammer and anvil in combination with means for repeatedly driving said hammer against said anvil; and wherein said means for actuating said sweep voltage circuit comprises means for generating a voltage pulse simultaneously with each striking of the anvil by the hammer, and means for transmitting said voltage pulse as a trigger for said sweep voltage generator circuit.

5. A system as defined by claim 4, wherein said means for generating a voltage pulse comprises a magnet attached to said hammer, and a coil surrounding said magnet, whereby the motion of said magnet is immediately arrested upon the striking of the anvil by the hammer, thereby generating said voltage pulse.

6. A system as defined by claim 4, wherein said means for transmitting said voltage pulse as a trigger for said sweep generator circuit includes an adjustable sweep delay circuit for keeping the critical portion of the oscilloscope display from drifting off-screen as the logging tool is moved from an interval characterized by a given range of acoustic velocities to an adjacent interval characterized by a substantially different range of acoustic velocities.

7. A well-logging tool adapted for suspension within a borehole, comprising acoustic pulse generating means, a pair of electro-acoustic transducers, and voltage spike generating means in combination with said pulse generating means; said pulse generating means comprising a hammer and anvil in combination with means for repeatedly driving said hammer against said anvil; and said spike generating means comprising a magnet attached to said hammer, in combination with a coil surrounding said magnet, whereby the arrested motion of said magnet caused by each striking of said hammer against said anvil generates a voltage spike in said coil.

8. An interval velocity well logging system which comprises means for generating an intermittent acoustic pulse, means for generating a voltage spike simultaneously with the generation of said acoustic pulse, first and second electro-acoustic detectors, said acoustic pulse generator, said voltage spike generator, and said detectors adapted to be suspended in substantially vertically spaced relationship within a wellbore, a variable delay line circuit connected to receive the output from said first detector, a dual trace cathode ray oscilloscope connected to receive and display the output from said detector as one trace, and connected to receive and display the output from said delay line circuit as a second trace, said oscilloscope comprising a sweep voltage generator triggered by the generation of said voltage spike, a variable voltage source, means for adjusting said delay line circuit, whereby an operator may visually maintain an alignment of the traces displayed by said oscilloscope; linkage means interconnecting said variable delay line circuit and said variable voltage source whereby variations imposed on said delay line automatically adjust the output of said voltage source to a level inversely proportional to the time of delay provided by said delay line, oscillographic recording means comprising chart drive means and pen drive means, means for controlling said chart drive in response to the depth of said detectors within said wellbore, and means responsive to the output of said voltage source for controlling said pen drive means.

9. An acoustic pulse transmitter comprising a hammer and anvil in combination with means for repeatedly driving said hammer against said anvil, a magnet attached to said hammer, and a coil surrounding said magnet, whereby the arrested motion of said magnet caused by each striking of said hammer against said anvil generates a voltage spike.

10. An acoustic pulse transmitter comprising anvil means, a solenoid, hammer means movably suspended within said solenoid, and adapted to be driven against said anvil by said solenoid, an induction coil, a magnet rigidly attached to said hammer means, said magnet being adapted to move within said coil as said hammer means moves toward said anvil means, whereby the arrested motion of said magnet caused by each striking of said hammer against said anvil generates a voltage spike.

(References on following page)

References Cited

UNITED STATES PATENTS

| | | | |
|---|---|---|---|
| 2,233,992 | 3/1941 | Wyckoff | 181—.53 |
| 2,269,453 | 1/1942 | Gayhart | 340—17 |
| 2,275,736 | 3/1942 | Cloud | 181—.53 |
| 2,301,458 | 11/1942 | Salvatori | 181—.53 |
| 2,436,503 | 2/1948 | Cleveland | 181—.53 |
| 2,993,553 | 7/1961 | Howes | 181—.53 |
| 3,071,203 | 1/1963 | Savage et al. | 340—18 |
| 3,090,940 | 5/1963 | Vogel | 340—18 |
| 3,170,136 | 2/1965 | Howes | 340—18 |

BENJAMIN A. BORCHELT, *Primary Examiner.*

KATHLEEN H. CLAFFY, SAMUEL FEINBERG,
*Examiners.*

M. KRAUS, J. W. MILLS, M. F. HUBLER,
*Assistant Examiners.*